United States Patent
Commins

[19]

[11] Patent Number: 6,109,850
[45] Date of Patent: *Aug. 29, 2000

[54] SCREW FASTENER IN METAL CONNECTOR TO WOOD STRUCTURE SHEAR CONNECTION

[75] Inventor: Alfred D. Commins, Danville, Calif.

[73] Assignee: Simpson Strong-Tie Company, Inc., Pleasanton, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/920,417

[22] Filed: Aug. 29, 1997

Related U.S. Application Data

[63] Continuation of application No. 08/725,003, Oct. 1, 1996, abandoned.

[51] Int. Cl.[7] .................................................. F16B 25/00
[52] U.S. Cl. .......................................... 411/387.2; 411/411
[58] Field of Search .................................. 411/386, 384, 411/411, 424, 387.1–387.5

[56] References Cited

U.S. PATENT DOCUMENTS

| | | |
|---|---|---|
| Re. 3,941 | 4/1870 | Pierce . |
| D. 31,749 | 10/1899 | North ...................................... 411/411 |
| 2,871,752 | 2/1959 | Stern . |
| 3,478,639 | 11/1969 | Gruca . |
| 4,834,602 | 5/1989 | Takasaki . |
| 5,295,774 | 3/1994 | Roberts .................................... 411/387 |
| 5,516,248 | 5/1996 | DeHaitre ................................. 411/387 |

FOREIGN PATENT DOCUMENTS

| | | | |
|---|---|---|---|
| 897908 | 4/1945 | France ................................... 411/411 |
| 278005 | 11/1990 | Japan ..................................... 411/411 |
| 840759 | 7/1960 | United Kingdom ................... 411/411 |

OTHER PUBLICATIONS

Lionel S. Marks, Mechanical Engineers' Handbook Publisher McGraw–Hill Book Company, Inc. pp. 879, 880.

Simpson Strong–Tie Co., Inc. Catalog, Copyright 1996 Catalog No. C–96 title: Wood Construction Connectors.

*Primary Examiner*—Flemming Saether
*Attorney, Agent, or Firm*—James R. Cypher

[57] ABSTRACT

A wood screw for holding a wood structural member to another member such as a sheet metal member a heavy metal member or another wood member wherein the screw includes a shank having a threaded portion and an unthreaded portion. A knurled means is provided on the shank between the threaded and the unthreaded portion for forming an annular zone of mashed and severed, as well as unsevered, wood fibers for preventing wood splitting and laterally holding the screw to the wood structural member in a tight fit.

2 Claims, 3 Drawing Sheets

SCREW FASTENER IN METAL CONNECTOR TO WOOD STRUCTURE SHEAR CONNECTION

This application is a continuation of pending application Ser. No. 08/725,003, filed Oct. 1, 1996, now abandoned.

BACKGROUND OF THE INVENTION

In regions of the country subject to earthquake and hurricane events, it is becoming increasingly common to provide metal straps and anchors for affixing wood frame structures to their concrete foundations. For many years manufacturers such as Simpson Strong-Tie Company, Inc. have designed holdowns for use with bolts. (see Simpson catalog, Jan. 1, 1996 pages 14 and 15 which illustrates holdowns such as HD2A covered by U.S. Pat. No. 4,665, 672). These holdowns are very effective, but their load rating is affected by the material which must be drilled out of the wood studs in order to receive the stud bolts which range in diameter from ⅝" up to 1". Moreover, some undesirable looseness is inherent in the connection by contractors who may inadvertently overdrill the bolt holes, or simply by the fact that wood shrinkage occurs after installation of the bolts.

The use of nails instead of bolts in holdowns has greatly reduced the shrinkage and looseness problem of bolts and has led to the development of strap holdowns as illustrated on pages 20, 22, and 23 e.g. of the Simpson catalog supra, (see e.g. U.S. Pat. No. 5,150,553.) The problem with holdowns which use nails is the fact that they must be very long to accommodate the many nails that are required. See e.g. Simpson catalog page 23 in which the HPAHD22-2p requires 23-16d nails and may be 22" to 42" in length. Many contractors now use nailing guns to drive the nails, but for the person who does not have a nailing gun, the prospect of driving 23 nails for each strap holdown means the expenditure of a great deal of energy driving the nails.

With the increasing use of powered drills, the feasibility of using wood screws as fasteners instead of nails and bolts is now a reality. The problem with screws, particularly for large loading in shear is that standard screws have several weaknesses. First, it was found that the heavy duty power drivers snapped the heads off a high percentage of standard screws before the clutch disengaged the drive at the end of the driving cycle when the head abruptly reached the immovable sheet metal connector plate. Second, those screws which had adequate unthreaded shank portions to resist the large shear loads, split the wood upon installation or shortly thereafter because the diameters of the unthreaded portions were larger than the bore made by the threaded portion of the screw. Third, adequate self drilling features were difficult to find in large size wood screws. Finally, existing screw fasteners with unthreaded portions adjacent the head which had smaller diameters to prevent wood splitting, were too loose. Looseness in standard screw fasteners between the unthreaded shank and the side of the bore hole which are subject only to pull out, is not a problem. Looseness, between the unthreaded shank portion and the side of the bore hole is a major problem when the screw fastener is subject to shear loads; particularly when the shear loads are cycling loads as they are in earthquakes and hurricanes. In such situations, each reversal of the shear loading tends to widen the bore opening until major loosening occurs and now the loads are impact loads which endanger the structure due to wood splitting.

SUMMARY OF THE INVENTION

This application describes a wood screw which solves the aforesaid problems. First, a higher strength steel was used in the wood screw of the present invention.

Second, the wood screw of the present invention is formed with a cutting means at the entering end so that bore holes need not be predrilled.

Finally, the major problem of looseness between the sides of the fastener and the bore hole has been solved by the use of a knurled section which functions in a unique manner described herein below.

The use of the wood screw of the present invention solves the problems introduced by bolts by eliminating the need to predrill large openings in the wood which weaken the wood member in tension as introduced by earthquake and hurricane loadings.

The use of the wood screw of the present invention solves the problem introduced by nails by enabling the strap connection to the wood frame to be significantly reduced in length thus saving in metal costs and installation problems.

The wood screw of the present invention is primarily for connecting wood structural members to sheet metal connectors in shear, but may also be used with heavy metal members or even wood to wood connections.

DESCRIPTION OF THE INVENTION

Figures 1, 4:
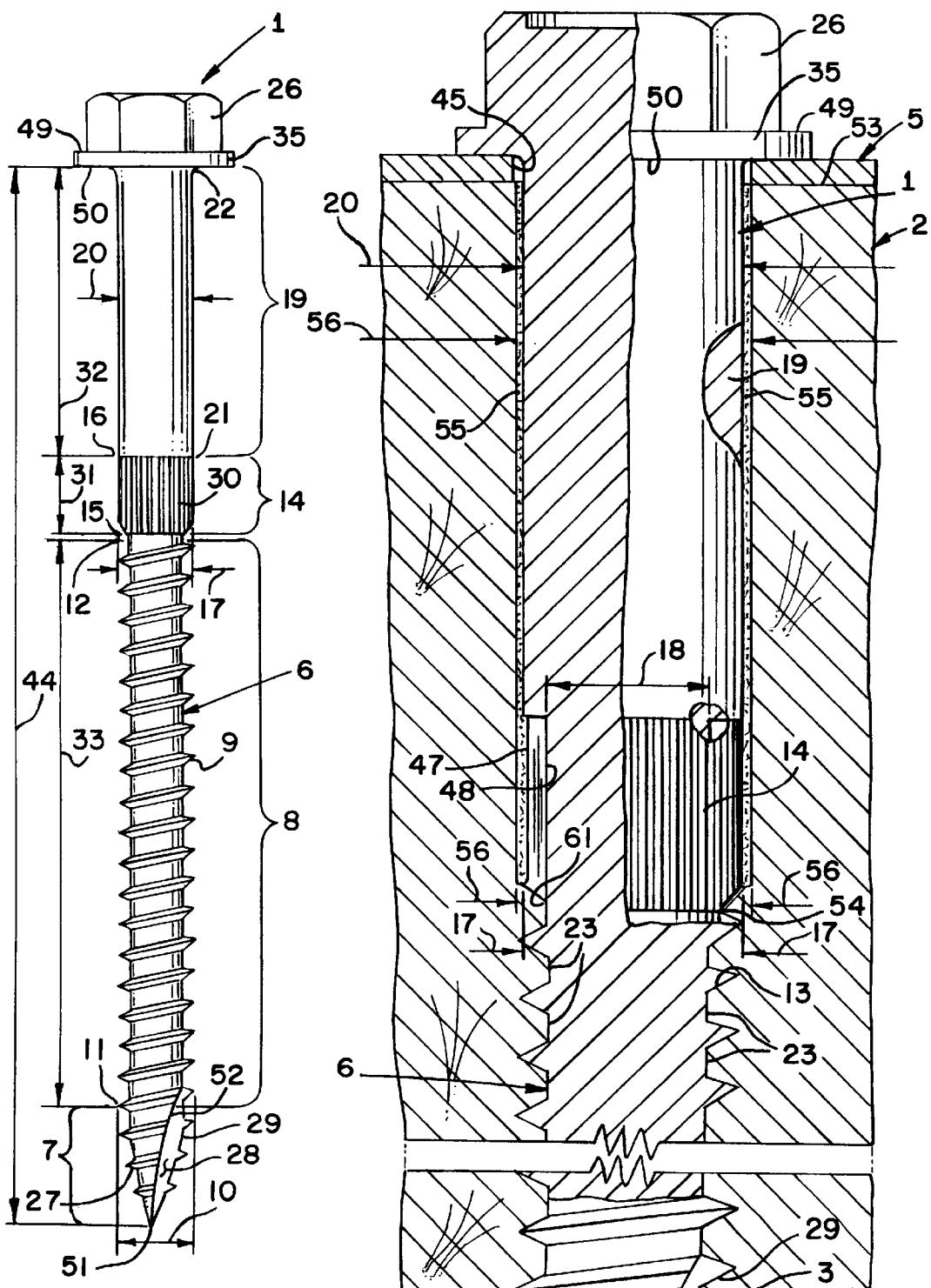
FIG. 1 is side elevational view of a wood screw which is representative of one embodiment of the present invention.
FIG. 4 is a partial central sectional view of the wood screw shown in FIGS. 1, 2 and 3 in which the wood screw is fully installed.

Referring to the drawings, and in particular FIG. 1, the wood screw 1 of the present invention is adapted to hold a wood structural member 2 formed with a first bore 3 to a sheet metal member 5 in shear.

While the wood screw 1 of the present invention has excellent pull out value, the design is primarily directed to resisting shear forces. Two examples of environments in which the wood screw of the present invention is subject to shear forces are illustrated in the drawings.

Figures 5, 6:
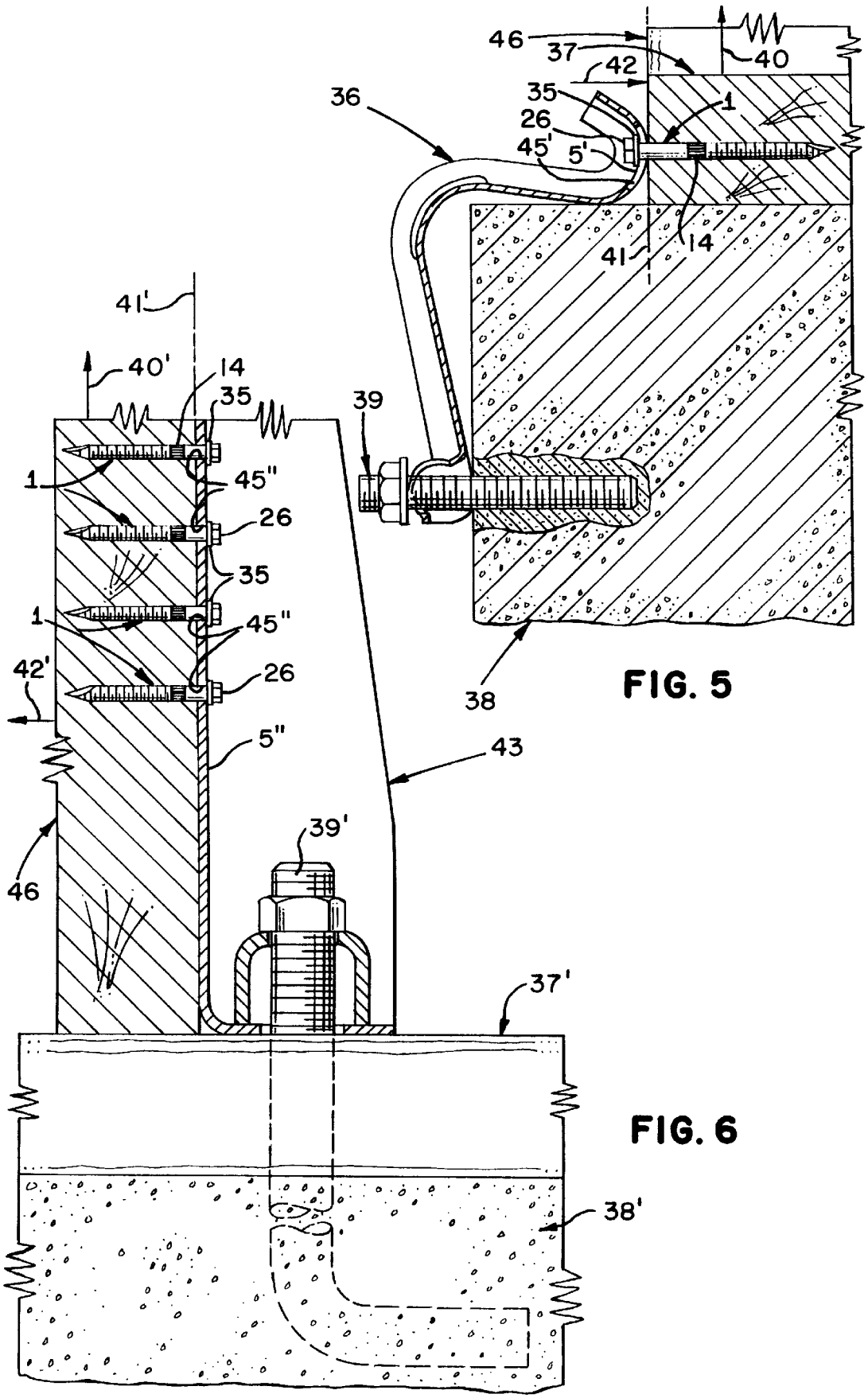
FIG. 5 is a side cross sectional view of the screw shown in FIG. 1 installed in a typical installation. A foundation to frame sheet metal connector is illustrated connecting a wood frame member to a concrete foundation.
FIG. 6 is a cross sectional view of another use of the wood screws of the present invention.

Referring to FIG. 5, wood screw 1 connects a retrofit holdown device 36 to a wood sill member 37 resting on concrete foundation 38. Wood screw 1 is inserted through opening 451 in sheet metal member 5'. A bolt 39 connects the retrofit holdown device 36 to foundation 38. Arrow 40 represents an upward force exerted on wood sill member 37 which may occur during either an earthquake or a high wind force such as a hurricane. Such an upward force as represented by arrow 40 exerts a shear force along shear plane 41 as shown in FIG. 5. As may be understood, a force acting in the direction of arrow 42 exerts a pull out force on wood screw 1.

Another example of shear forces exerted on wood screws 1 of the present invention is illustrated in FIG. 6. Here, a sheet metal holdown 43 is connected to a foundation 38' by anchor bolt 39' and securely holds wood sill member 37' to foundation 38'. Wood screws 1 of the present invention are inserted through openings 45" in sheet metal member 5" of holdown 43 into wood stud member 46. Arrow 40' represents an upward force imposed by an earthquake or high winds such as a hurricane which imposes a shear load along shear plane 41'. Arrow 42' represents a horizontal load imposed by an earthquake or high winds such as a hurricane which imposes a pullout force on wood screws 1.

Figures 2, 3:
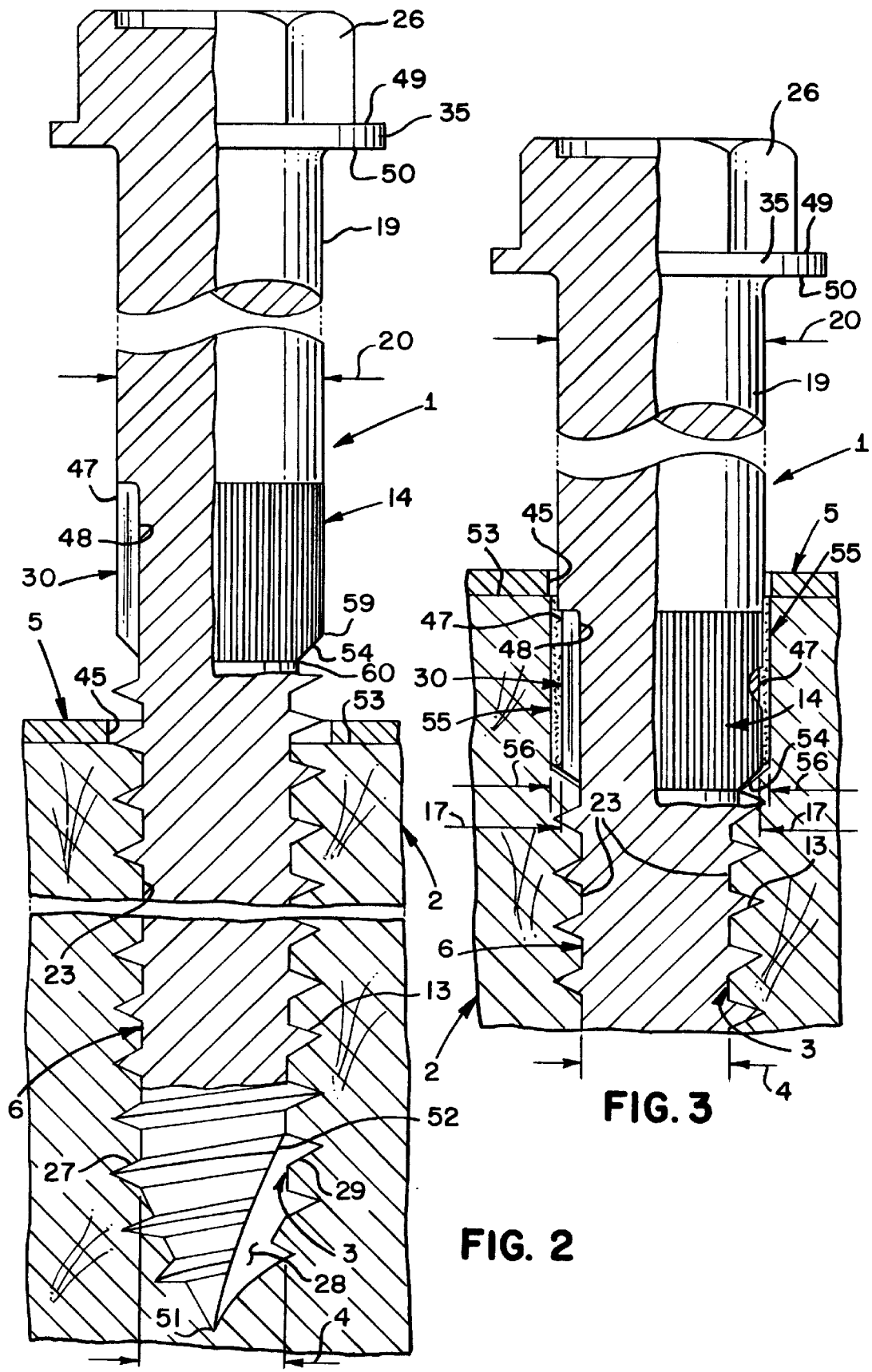
FIG. 2 is an enlarged scale, partial central sectional view of the fastener shown in FIG. 1 in operative association with a portion of a wood structural member and a portion of a sheet metal member. Portions of the wood screw have been cut to indicate portions of the axial length of the wood screw have been removed so that the wood screw may meet the drawing paper restrictions. The upper portion of the wood screw is only partially in cross section to clarify the details of the invention. In this view, the pointed end portion 7 and substantially all of the threaded shank portion 8 has moved through the opening in the sheet metal member 5 and entered the wood structural member 2. The knurled section 14 has not yet entered the bore opening 3.
FIG. 3 is partial central sectional view of the wood screw shown in FIGS. 1 and 2 in which the knurled portion 14 has just passed through the opening in the sheet metal member 5 and has entered the wood structural member 2. A portion of the knurled portion 14 has been removed to show how the portions between the knurls fill up with mashed wood fibers from the wood structural member.

Referring now in detail to the wood screw 1 of the present invention as most clearly shown in FIGS. 1 and 2, the screw 1 includes; a shank 6 having an overall length 44; a pointed end portion 7 formed on an entering extremity of the shank 6; the shank 6 having a threaded shank portion 8 having thread convolutions 9 with an outer diameter 10 greater than the diameter of the first bore 3 and beginning at a first point 11 adjacent the pointed end portion 7 and extending axially along the periphery of the shank 6 to a second point 12 and adapted to form and engage threads 13 in the wood structural member 2; knurled portion 14 formed in a portion of the shank 6 having a first point 15 adjacent the second point 12 of the threaded shank portion 8 and extending axially along the shank 6 to a second point 16 and having an outside diameter 17 generally equal to the outer diameter 10 of the thread convolutions 9 in the threaded shank portion 8 and having an inside diameter 18 (see FIG. 4) less than the outside diameter 17 of the knurled portion 14; the shank 6 having an unthreaded shank portion 19 having a diameter 20 generally equal to the outside diameter 17 of the knurled portion 14 and having a first point 21 adjacent the second point 16 of the knurled portion 14 and extending axially along the shank 6 and terminating at a second point 22; the knurled portion 14 being adapted for mashing over and radially outwardly without severing a substantial proportion of the wood fibers of the inner portions 23 of the threads 13 formed in the wood structural member 2 forming an annular zone 55 of mashed and severed, as well as unsevered wood fibers having an outer diameter 56 greater than the diameter 20 of the unthreaded shank portion 19 and forming a tight fit between the unthreaded shank portion 19 and the annular zone 55 of mashed and severed, as well as unsevered, wood fibers of the wood structural member 2; and a head 26 integrally connected to the shank 6 adjacent the second point 22 of the unthreaded shank portion 19.

The wood screw of the present invention need not have a threaded pointed end or a means for cutting its own bore and threads in a wood member if a bore is predrilled. It is highly advantageous, however, to form a wood screw 1 which will drill its own bore and threads in a wood member since predrilling a bore is expensive in installation time. Power drivers to drive large diameter wood screws are now widely available and thus, referring to FIGS. 1 and 4, a preferred form of the wood screw 1 of the present invention adapted to hold a wood structural member 2 to a sheet metal member 5 in shear includes; a shank 6; a pointed end portion 7 formed on an entering extremity of the shank 6 having a plurality of convolutions 27 and a recess 28 providing a cutting edge 29 adapted for forming a first bore 3 having a diameter 4; and the shank 6 having a threaded shank portion 8 having thread convolutions 9 similar to the thread convolutions 27 on the pointed end portion 7 with an outer diameter 10 greater than the diameter 4 of the first bore 3 and beginning at a first point 11 adjacent the pointed end portion 7 and extending axially along the periphery of the shank 6 to a second point 12 and adapted to form and engage threads 13 in the wood structural member 2.

All other elements of the preferred form of wood screw 1 are identical to the previously described wood screw and for purposes of brevity are not repeated.

Referring to FIG. 3, knurled means 14 may be double knurled in a cross hatched pattern or have single straight knurls formed at an angle to the axis of the screw. It has been found, however, that straight knurls 30 (see FIG. 2) having a dull edge 47 and valleys 48 between the dull edges 47 perform satisfactorily.

It has also been found that where the axial length 31 (see FIG. 1) of the knurled portion 14 is substantially less than the axial length 32 of the unthreaded shank portion 19 satisfactory results are obtained.

Providing wood screw 1 with an unthreaded portion 19 reduces the power requirements to drive the screw and maximizes the amount of metal at the shear plane 41 and 41' (see FIGS. 5 and 6) adjacent the head 26 of the wood screw 1. Accordingly, the axial length 32 of the unthreaded portion 19 is preferably substantially less than the axial length 33 of the threaded portion 8.

To accommodate the power driven tool and provide maximum gripping power, the head 26 is preferably hexagonal in shape.

The head 26 is preferably formed with an integral washer 35 for several reasons. First, the upper surface 49 serves as an abutment for the nose of the power tool. Second, the undersurface 50 of washer 35 provides surface area to prevent the power drill from inserting the hex head 26 through opening 45. Finally, undersurface 50 frictionally engages sheet metal member 5 and the increased friction of the washer 35 against sheet metal member 5 imposes greater resistance which may cause slip clutches in the power tool to operate and stop the driving of the wood screw 1.

Operation of the wood screw of the present invention is as follows. Referring to FIG. 2, the power tool nose is inserted over hexagonal head 26 with a portion of the power tool nose in abutment with upper surface 49 of washer 35. The point 51 of wood screw 6 is then inserted through opening 45 in the sheet metal member 5 and rotation of the wood screw 6 is begun. Cutting means as formed by edge 29, recess 28, and curved surface 52 immediately begins to form first bore 3 (see FIG. 4) and to cut threads 13 into wood member 2. The cutting means on the wood screw 6 of the present invention is well known in the industry and is similar to the cutting means disclosed in Stern, U.S. Pat. No. 2,871,752.

Thread convolutions 27 on pointed end portion 7 which are part of cutting edge 29, cut threads in wood structural member 2 which enable thread convolutions 9 on threaded shank portion 8 to easily follow into the wood. As stated above, threads 13 are formed in the wood structural member having inner portions 23 extending to the outer diameter 4 of first bore 3.

Referring to FIG. 3, as the tapered entering portion 54 (see FIG. 3) of knurled means 14 of wood screw 1 reaches outer face 53 of wood structural member 2, the dull edges 47 of each knurl 30 engage inner portions 23 of threads 13. It is preferable to taper the entering portions 54 of the knurled portion 14 as shown in the drawings to lessen the shock as the knurls 30 strike the inner portions 23 of threads 13. Referring to FIG. 2, tapered entering portion 54 is bounded by lower bevel end 60 and upper bevel end 59. This is especially important since as previously stated edges 47 of the knurls 30 are dull and thus there is a greater resistance encountered by the wood screw 1 as it proceeds through the wood structural member 2.

The function of the dull edges 47 of knurls 30 is to bend the inner portions 23 of threads 13 in the structural wood member so as to mash rather than to sever a substantial portion of the wood fibers of the structural wood member. These bent over and mashed wood fibers as well as the severed wood fibers are illustrated in FIGS. 3 and 4 and are indicated generally by the number 55 which represents an annular zone of mashed and severed, as well as unsevered, wood fibers. The annular zone of mashed wood fibers 55, as seen when wood screw 1 is fully seated, is bounded by the space outboard of diameter 20 of unthreaded shank portion 19 and outer diameter 56 of the mashed fiber annular zone. Annular zone of mashed wood fibers 55 as seen in FIG. 4 extends from outer face 53 of wood structural member 2 to penetration point 61 (see FIG. 4) of lower bevel end 59 of knurled portion 14 (see FIG. 2).

As the knurled portion 14 proceeds into the wood structural member 2, the valleys 48 between the dull edge ridges 47 of knurls 30 fill with the unsevered fiber ends as well as severed wood fibers of the mashed over inner portions 23 of threads 13 and loose cuttings from the cutting edge 29 on the pointed end portion 7 of the wood screw 1. This filling of the valleys 48 in the knurls 30 further reduces the cutting or severing of the wood fibers as the knurl means 14 continues through the wood structural member 2.

The effects of the previously described mashing of the wood fibers is shown in FIG. 4. In this view, the wood screw 1 has been fully inserted into the structural wood member 2 and is now in place to resist shear forces acting between sheet metal member 5 and the wood structural member 2. The result of the wood mashing of inner portions 23 of threads 13 of the wood structural member 2 is that the mashed wood fibers form an annular zone 55 which tightly fills any space between the outer diameter 20 of unthreaded shank portion 19 and the outer diameter 56 of the mashed fiber annular zone 55. This annular zone 55 of tightly packed mashed wood fibers mixed with some cuttings from cutting edge 29 on the pointed end portion 7 of the wood screw 1 prevents essentially all looseness between the wood screw 1 and the structural member 2. This tight fit of the wood screw 1 with the structural wood member serves to increase the wood screws resistance to lateral displacement which contributes to the increase in shear resistance along the shear planes 41 and 41' as seen, e.g. in FIGS. 5 and 6.

By sizing the knurled portion 14 with an outside diameter 17 generally equal to the outer diameter 10 of the thread convolutions 9 in the threaded shank portion 8 and generally equal to the diameter 20 of the unthreaded shank portion 19, wood splitting as the unthreaded shank portion enters the wood structural member 2 is obviated.

As an example, the wood screw 1 of the present invention may be manufactured from 1022 steel (SAE Grade 5) with a finish coat of zinc and dichromate. The hex washer head 26 may be 0.375 inch (9.5 mm). The self drilling tip or pointed end portion 7 may be a Type-17, and allows for driving without lead holes. Lead holes, however, may be required by the local building official, depending on wood type and moisture content in accordance with Section 2339.112 of the Code of International Conference of Building Officials (ICBO).

Some typical dimensions of wood screws of the present invention having an overall shank length 44 measured from the underside 50 of washer 35 to the point 51 ranging from 1½" to 3½" are as follows: The length 33 of the threaded section 8 may vary from ⅞" to 3¼" while the axial length 31 of the knurled section 14 remains at a constant 0.250". and the length 32 of the unthreaded shank portion 19 varies with the length of the wood screw 1. For example, where the shank length is 1½₁, the unthreaded shank portion 19 may be ⅝" whereas an overall shank length 44 of 3½" may have an unthreaded shank length 19 of 1¼". Outer diameter 10 of thread convolutions 9 may have a diameter of 0.259–0.250" and an inner diameter of 0.187" to 0.1 83".

While the wood screw of the present invention is shown in FIGS. 5 and 6 for use with holdown connectors used in attaching wood frame buildings to concrete foundations, the wood screw as above described may be used anywhere that wood screws of the size and type described may be used. The wood screws of the present invention are being presently evaluated and tests are being conducted to determine loads which may be carried so that they may receive building code approval. The wood screws of the present invention may be used with heavy metal members or wood to wood connections.

I claim:

1. In a shear connection including a wood screw fastener and a wood structural member formed with a first bore and a metal connector including a substantially planar portion having a thickness substantially less than the length of said fastener and formed with an opening, comprising; said wood screw fastener including:

a. a shank having a head end;
   b. a pointed end portion formed on an entering extremity of said shank opposite said head end for insertion through said opening in said metal connector and into said first bore in said wood structural member;
   c. said shank having a threaded shank portion having thread convolutions with an outer diameter greater than the diameter of said first bore and beginning at a first point adjacent said pointed end portion and extending axially along the periphery of said shank to a second point and adapted to form and engage threads in said wood structural member;
   d. said shank having a knurled portion formed with a plurality of knurls having dull edges and having a first point adjacent said second point of said threaded shank portion and extending axially along said shank to a second point and having an outside diameter generally equal to the outer diameter of said thread convolutions in said threaded shank portion and having an inside diameter substantially less than said outside diameter of said knurled portion and equal to or only slightly greater than the diameter of said first bore;
   e. said knurls are formed with a tapered entering portion forming a smooth transition between the inner diameter of said shank and said outside diameter of said knurled portion;
   f. said shank having an unthreaded shank portion having a diameter generally equal to said outside diameter of said knurled portion and having a first point adjacent said second point of said knurled portion and extending axially along said shank a distance substantially greater than the length of said knurled portion and the thickness of said metal connector at said planar portion and terminating at a second point adjacent said head end;

g. said knurls having said dull edges bend over buckle and crush without severing, a substantial proportion of the wood fibers of the inner portions of said threads formed in said wood structural member forming a nominal annular zone of bent over buckled and crushed wood fibers, having an outer diameter nominally greater than said diameter of said unthreaded shank portion and forming a tight fit between said unthreaded shank portion and said nominal annular zone of bent over buckled and crushed wood fibers, of said wood structural member;

h. a head integrally connected to said shank at said head end; and i. said unthreaded shank portion extending a substantial distance within said wood structural member.

2. In a shear connection including a wood screw fastener and a wood structural member and a metal connector including a substantially planar portion having a thickness substantially less than the length of said fastener, comprising; said screw fastener including, a. a shank having a head end;

b. a pointed end portion formed on an entering extremity of said shank, opposite said head end, having a plurality of thread convolutions and a recess providing a cutting edge for insertion through said metal connector and forming a first bore in said wood structural member and having a selected outer diameter;

c. said shank having a threaded shank portion having thread convolutions similar to said thread convolutions on said pointed end portion with an outer diameter greater than said diameter of said first bore and beginning at a first point adjacent said pointed end portion and extending axially along the periphery of said shank to a second end point and adapted to form and engage threads in said wood structural member;

d. said shank having a knurled portion formed with a plurality of knurls having dull edges and having a first point adjacent said second point of said threaded shank portion and extending axially along said shank to a second point and having an outside diameter generally equal to the outer diameter of said thread convolutions in said threaded shank portion and having an inside diameter substantially less than said outside diameter of said knurled portion and equal to or only slightly greater than the diameter of said first bore;

e. said knurls are formed with a tapered entering portion forming a smooth transition between the inner diameter of said shank and said outside diameter of said knurled portion;

f. said shank having an unthreaded shank portion having a diameter generally equal to said outside diameter of said knurled portion and having a first point adjacent said second point of said knurled portion and extending axially along said shank a distance substantially greater than the length of said knurled portion and the thickness of said metal connector at said planar portion and terminating at a second point adjacent said head end;

g. said knurls having said dull edges bend over, buckle and crush without severing, a substantial proportion of the wood fibers of the inner portions of said threads formed in said wood structural member forming a nominal annular zone of bent over, buckled and crushed, wood fibers having an outer diameter nominally greater than said diameter of said unthreaded shank portion and forming a tight fit between said unthreaded shank portion and said nominal annular zone of bent over, buckled and crushed wood fibers of said wood structural member;

h. a head integrally connected to said shank at said head end; and i. said unthreaded shank portion extending a substantial distance within said wood structural member.

\* \* \* \* \*

UNITED STATES PATENT AND TRADEMARK OFFICE
CERTIFICATE OF CORRECTION

PATENT NO. : 6109850
DATED : August 29, 2000
INVENTOR(S) : Alfred D. Commins

It is certified that error appears in the above-identified patent and that said Letters Patent is hereby corrected as shown below:

Col. 03, line 04
replace "451"
with --45'--.

Col. 04, line 17
replace "means"
with --portion--.

Col. 05, line 02
replace "means"
with --portion--.

Col. 05, line 28
replace "59"
with --60--.

Col. 06, line 16
replace "1 1/21"
with --1 1/2"--.

Signed and Sealed this

Seventeenth Day of April, 2001

Attest:

NICHOLAS P. GODICI

Attesting Officer

Acting Director of the United States Patent and Trademark Office